(12) United States Patent
Otsuki

(10) Patent No.: US 10,469,766 B2
(45) Date of Patent: Nov. 5, 2019

(54) IMAGE PROCESSING APPARATUS, SURVEILLANCE CAMERA SYSTEM, AND IMAGE PROCESSING METHOD TO IMPROVE CONTRAST OF A MOVING OBJECT

(71) Applicant: SONY CORPORATION, Tokyo (JP)

(72) Inventor: Seichi Otsuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 15/521,007

(22) PCT Filed: Sep. 16, 2015

(86) PCT No.: PCT/JP2015/004711
§ 371 (c)(1),
(2) Date: Apr. 21, 2017

(87) PCT Pub. No.: WO2016/067507
PCT Pub. Date: May 6, 2016

(65) Prior Publication Data
US 2017/0339349 A1  Nov. 23, 2017

(30) Foreign Application Priority Data
Oct. 28, 2014  (JP) .................. 2014-219548

(51) Int. Cl.
*H04N 5/243* (2006.01)
*H04N 5/232* (2006.01)
*H04N 7/18* (2006.01)
*G08B 13/196* (2006.01)
*H04N 5/20* (2006.01)
*H04N 5/235* (2006.01)

(52) U.S. Cl.
CPC .......... *H04N 5/243* (2013.01); *G08B 13/196* (2013.01); *H04N 5/20* (2013.01); *H04N 5/2351* (2013.01); *H04N 5/23254* (2013.01); *H04N 7/18* (2013.01)

(58) Field of Classification Search
CPC .................................................. H04N 5/2351
See application file for complete search history.

(56) References Cited

U.S. PATENT DOCUMENTS

| 2007/0081721 | A1* | 4/2007 | Xiao | G06T 5/009 |
| | | | | 382/167 |
| 2009/0109290 | A1* | 4/2009 | Ye | G09G 3/3611 |
| | | | | 348/155 |
| 2011/0157209 | A1* | 6/2011 | Saito | G09G 3/20 |
| | | | | 345/589 |

FOREIGN PATENT DOCUMENTS

| JP | 2010-220032 A | 9/2010 |
| JP | 2013-250314 A | 12/2013 |
| JP | 2014-158074 A | 8/2014 |
| WO | 2014/087606 A1 | 6/2014 |

* cited by examiner

*Primary Examiner* — Mainul Hasan
(74) *Attorney, Agent, or Firm* — Chip Law Group

(57) ABSTRACT

An image processing apparatus includes an image processor. The image processor inputs image data, determines amount of motion within an image on the basis of the image data, and corrects and outputs a luminance of the image data such that a contrast of an object, whose amount of motion is large, increases.

8 Claims, 6 Drawing Sheets

IMAGE PROCESSING APPARATUS, SURVEILLANCE CAMERA SYSTEM, AND IMAGE PROCESSING METHOD TO IMPROVE CONTRAST OF A MOVING OBJECT

CROSS REFERENCE TO RELATED APPLICATIONS

This application is a U.S. National Phase of International Patent Application No. PCT/JP2015/004711 filed on Sep. 16, 2015, which claims priority benefit of Japanese Patent Application No. JP 2014-219548 filed in the Japan Patent Office on Oct. 28, 2014. Each of the above-referenced applications is hereby incorporated herein by reference in its entirety.

TECHNICAL FIELD

The present technology relates to a technology of, for example, an image processing apparatus that inputs image information and corrects and outputs a luminance of the input image information.

BACKGROUND ART

Conventionally, a technology of correcting and outputting a luminance (tone) of an input image is widely known. For example, in the technology described in Patent Literature 1 below, first of all, a luminance histogram of an input image is generated. Next, any tone curve of a plurality of tone curves prepared in advance is selected on the basis of this luminance histogram. Then, the luminance of the image is corrected and output on the basis of this tone curve.

In the technology described in Patent Literature 1, with respect to an image whose luminance frequency is concentrated on a middle portion of the luminance histogram, for example, a tone curve having a steep slope in the middle portion of the luminance is used, and luminance tones are preferentially allocated to the middle portion of the luminance. In the technology described in Patent Literature 1, the use of such a tone curve prevents the image from becoming an unclear image having a small difference between brightness and darkness.

In the technology described in Patent Literature 1, a method of preferentially allocating the luminance tones to a part of the input image, in which luminance frequency is high (i.e., portion having the same brightness level and a large area), is employed. However, for example, if such a method is used for an image including the sky (high luminance, large area) and a person (middle luminance, small area), the luminance tones allocated to the sky increase while the luminance tones allocated to the person decrease, and hence a phenomenon in which the contrast for the person is lowered and the person is not clearly visible may occur.

As a technology associated with such a problem, Patent Literature 2 below is exemplified. In this technology, a method of generating a high-frequency component histogram in addition to the luminance histogram and correcting the luminance histogram on the basis of the high-frequency component histogram is employed. In accordance with this method, it is possible to re-distribute tones allocated to the sky corresponding to low-frequency components to the person corresponding to high-frequency components.

CITATION LIST

Patent Literature

Patent Literature 1: Japanese Patent Application Laid-open No. 2013-250314
Patent Literature 2: Japanese Patent Application Laid-open No. 2010-220032

DISCLOSURE OF INVENTION

Technical Problem

In such a technical field, a technology by which a contrast of a moving object such as a person and a car is increased to make the moving object easily visible is desirable. Such a technology is desirable especially in a system in which a moving object needs to be clearly visible, for example, a surveillance camera system.

In view of the above-mentioned circumstances, it is an object of the present technology to provide a technology by which a contrast of a moving object is increased to make a moving object easily visible.

Solution to Problem

An image processing apparatus according to the present technology includes an image processor.

The image processor inputs image data, determines an amount of motion within an image on the basis of the image data, and corrects and outputs a luminance of the image data such that a contrast of an object whose amount of motion is large increases.

In this image processing apparatus, the contrast of the object whose amount of motion is large increases, and hence it becomes possible to make a moving object (e.g., person, car) easily visible.

In the image processing apparatus, the image processor may determine a high-frequency component level within the image on the basis of the image data and correct and output the luminance of the image data such that a contrast of an object whose high-frequency component level is high increases.

In this image processing apparatus, the contrast of the object whose high-frequency component level is high increases, and hence it becomes possible to make an object (e.g., person, car) whose high-frequency component level is high easily visible.

In the image processing apparatus, the image processor may generate a luminance histogram indicating a distribution of luminances of pixels in the image data and reflecting the amount of motion and generate a tone curve for correcting the luminance of the image data on the basis of the luminance histogram.

With this, it is possible to generate a tone curve for suitably increasing the contrast of the object whose amount of motion is large.

In the image processing apparatus, the image processor may generate a luminance histogram indicating a distribution of luminances of pixels in the image data and reflecting the amount of motion and the high-frequency component level and generate a tone curve for correcting the luminance of the image data on the basis of the luminance histogram.

With this, it is possible to generate a tone curve for suitably increasing the contrast of the object whose amount of motion is large and whose high-frequency component level is high.

In the image processing apparatus, the image processor may generate, when generating the luminance histogram, the luminance histogram by performing processing of performing weighting, which depends on the amount of motion at a position corresponding to the pixel, on a count value for counting the frequency of pixels and adding the weighted count value to a bin of a plurality of bins divided in a manner that depends on luminances, which corresponds to a luminance of the pixel, the processing being performed for each pixel.

With this, it is possible to generate a luminance histogram for suitably increasing the contrast of the object whose amount of motion is large.

In the image processing apparatus, the image processor may generate, when generating the luminance histogram, the luminance histogram by performing processing of performing weighting, which depends on the amount of motion and the high-frequency component level at a position corresponding to the pixel, on a count value for counting the frequency of pixels and adding the weighted count value to a bin of a plurality of bins divided in a manner that depends on luminances, which corresponds to a luminance of the pixel, the processing being performed for each pixel.

With this, it is possible to generate a luminance histogram for suitably increasing the contrast of the object whose amount of motion is large and whose high-frequency component level is high.

A surveillance camera system according to the present technology includes an imaging section and an image processor.

The imaging section is placed at a monitoring position.

The image processor inputs image data captured by the imaging section, determines an amount of motion within an image on the basis of the image data, and corrects and outputs a luminance of the image data such that a contrast of an object whose amount of motion is large increases.

In an image processing method according to the present technology, image data is input.

An amount of motion within an image is determined on the basis of the image data.

A luminance of the image data is corrected and output such that a contrast of an object whose amount of motion is large increases.

A program according to the present technology causes an image processing apparatus to execute the steps of:
inputting image data;
determining an amount of motion within an image on the basis of the image data; and
correcting and outputting a luminance of the image data such that a contrast of an object whose amount of motion is large increases.

Advantageous Effects of Invention

As described above, in accordance with the present technology, it is possible to provide a technology by which a contrast of a moving object is increased to make a moving object easily visible.

MODE(S) FOR CARRYING OUT THE INVENTION

Hereinafter, embodiments according to the present technology will be described with reference to the drawings.

<Overall Configuration of Surveillance Camera System 100 and Configurations of Respective Sections>

Figure 1:
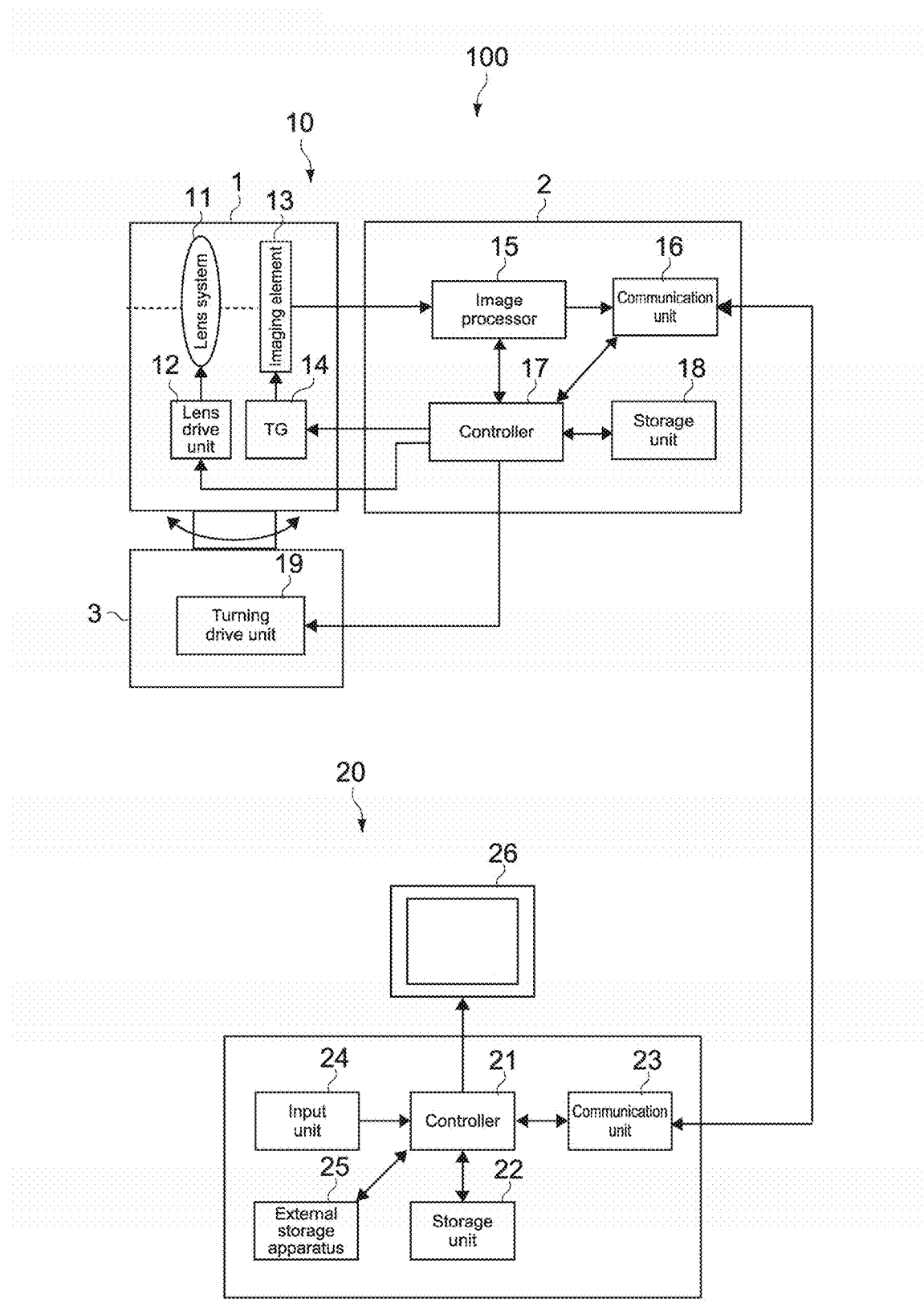
FIG. 1 A block diagram showing a surveillance camera system according to an embodiment of the present technology.

FIG. 1 is a block diagram showing a surveillance camera system 100 according to an embodiment of the present technology. As shown in FIG. 1, the surveillance camera system 100 includes a surveillance camera unit 10 and a monitoring terminal 20.

The surveillance camera unit 10 is appropriately placed in a location that needs to be monitored, for example, a store, a financial institution, a station, or a street. Although the single surveillance camera unit 10 is provided in the example shown in FIG. 1, two or more surveillance camera units 10 may be provided.

The surveillance camera unit 10 includes a lens unit 1 (imaging section), a control unit 2 (image processing apparatus), and a turning unit 3 that turns the lens unit 1 in a pan direction (left- and right-hand directions) and a tilt direction (upper and lower directions).

The lens unit 1 includes an optical lens system 11, a lens drive unit 12, an imaging element 13, and a timing generator (TG) 14. The control unit 2 includes an image processor 15, a communication unit 16, a controller 17, and a storage unit 18. The turning unit 3 includes a turning drive unit 19.

The optical lens system 11 includes various lenses such as an imaging lens, a zoom lens, and a focus lens and a diaphragm. A lens drive unit 12 is constituted of a motor or the like. The lens drive unit 12 moves the zoom lens or the focus lens in an optical axis direction in accordance with an instruction from the controller 17 or adjusts the aperture of the diaphragm.

The imaging element 13 is constituted of a CMOS (Complementary Metal Oxide Semiconductor) sensor, a CCD (Charge Coupled Device) sensor, or the like. The imaging element 13 includes a plurality of pixels (R-pixels, G-pixels, B-pixels). The imaging element 13 converts object light entering an exposure surface of the imaging element 13 into an electronic signal by photoelectric conversion for each pixel. Then, the imaging element 13 outputs the obtained three primary color signals (R, G, B) to the image processor 15 as image data.

The timing generator 14 (TG) generates a driving pulse necessary to drive the imaging element 13 in accordance with an instruction from the controller 17 and supplies the driving pulse to the imaging element 13. Imaging is performed by the imaging element 13 being driven by the timing generator 14.

The image processor 15 performs noise removal processing, luminance (tone) correction processing, or the like on the input image data, and outputs the image data subjected to such processing to the communication unit 16.

With the surveillance camera system 100 according to this embodiment, processing of preferentially allocating luminance tones to a moving object contained in the image data or an object corresponding to high-frequency components in the luminance (tone) correction processing performed by the image processor 15. This processing will be described later in details in the section "Description of Operation."

The communication unit 16 sends and receives signals to/from the monitoring terminal 20 through wired connection or wireless connection. The communication unit 16 sends image data, which is subjected to the luminance (tone) correction processing, to the monitoring terminal 20. Further, The communication unit 16 receives control signals for zoom adjustment, focus adjustment, and turning operation, which are sent from the monitoring terminal 20, and outputs them to the controller 17.

The controller 17 is constituted of, for example, a CPU (Central Processing Unit) and comprehensively controls the respective sections of the surveillance camera unit 10. For example, in accordance with a control signal from the monitoring terminal 20, the controller 17 drives the lens drive unit 12 to perform a zoom adjustment or focus adjustment or drives the turning drive unit 19 to turn the lens unit 1.

The storage unit 18 includes a volatile memory (e.g., RAM (Random Access Memory)) used as a working area of the controller 17 and a nonvolatile memory (e.g., ROM (Read Only Memory)) in which various programs or data items necessary for processing of the controller 17 are fixedly stored.

The turning drive unit 19 is constituted of a motor or the like. The turning drive unit 19 turns the lens unit 1 in the pan direction and the tilt direction in accordance with an instruction from the controller 17.

The monitoring terminal 20 is constituted of, for example, a PC (Personal Computer). The monitoring terminal 20 is placed in a monitoring room or the like and managed by a monitoring person. The monitoring terminal 20 includes a controller 21, a storage unit 22, a communication unit 23, an input unit 24, an external storage apparatus 25, and a display apparatus 26.

The controller 21 is constituted of, for example, a CPU and comprehensively controls the respective sections of the monitoring terminal 20. The controller 21 displays image data, which is sent from the surveillance camera unit 10, on a screen of the display apparatus 26. Further, the controller 21 generates, in accordance with a monitoring person's instruction input from the input unit 24, a control signal for performing a zoom adjustment or focus adjustment, a control signal for turning the lens unit 1, and the like and causes the communication unit 23 to send those signals.

The storage unit 22 includes a volatile memory (e.g., RAM) used as a working area of the controller 21 and a nonvolatile memory (e.g., ROM) in which various programs and data items necessary for processing of the controller 21 are fixedly stored.

The communication unit 23 sends and receives signals to/from the surveillance camera unit 10 through wired connection or wireless connection. The communication unit 23 receives image data sent from the surveillance camera unit 10. Further, the communication unit 23 sends control signals for zoom adjustment, focus adjustment, and turning operation to the surveillance camera unit 10.

The display apparatus 26 is constituted of, for example, a liquid-crystal display or an organic EL (EL: Electro luminescence) display. The display apparatus 26 displays image data, which is captured by the surveillance camera unit 10, on the screen under the control of the controller 21. Note that, although the display apparatus 26 basically displays the captured image data on the screen in real time, it is also possible to display image data recorded on the external storage apparatus 25.

The input unit 24 is constituted of, for example, a keyboard and a mouse. The input unit 24 converts a monitoring person's operation into an operation signal and outputs this signal to the controller 17. The monitoring person can adjust the zoom or focus or turn the lens unit 1 by inputting an instruction via the input unit 24.

The external storage apparatus 25 is constituted of, for example, a hard disk drive (HDD) or an optical disc drive (ODD) and saves (records) image data sent from the surveillance camera unit 10. The image data saved in the external storage apparatus 25 is read out from the external storage apparatus 25 and displayed on the screen of the display apparatus 26 in a manner that depends on needs.

Note that, although the image data is saved in the monitoring terminal 20 in this embodiment, the image data may be saved in the surveillance camera unit 10 or may be saved in a server apparatus prepared in a network.

[Description of Operation]

Figure 2:
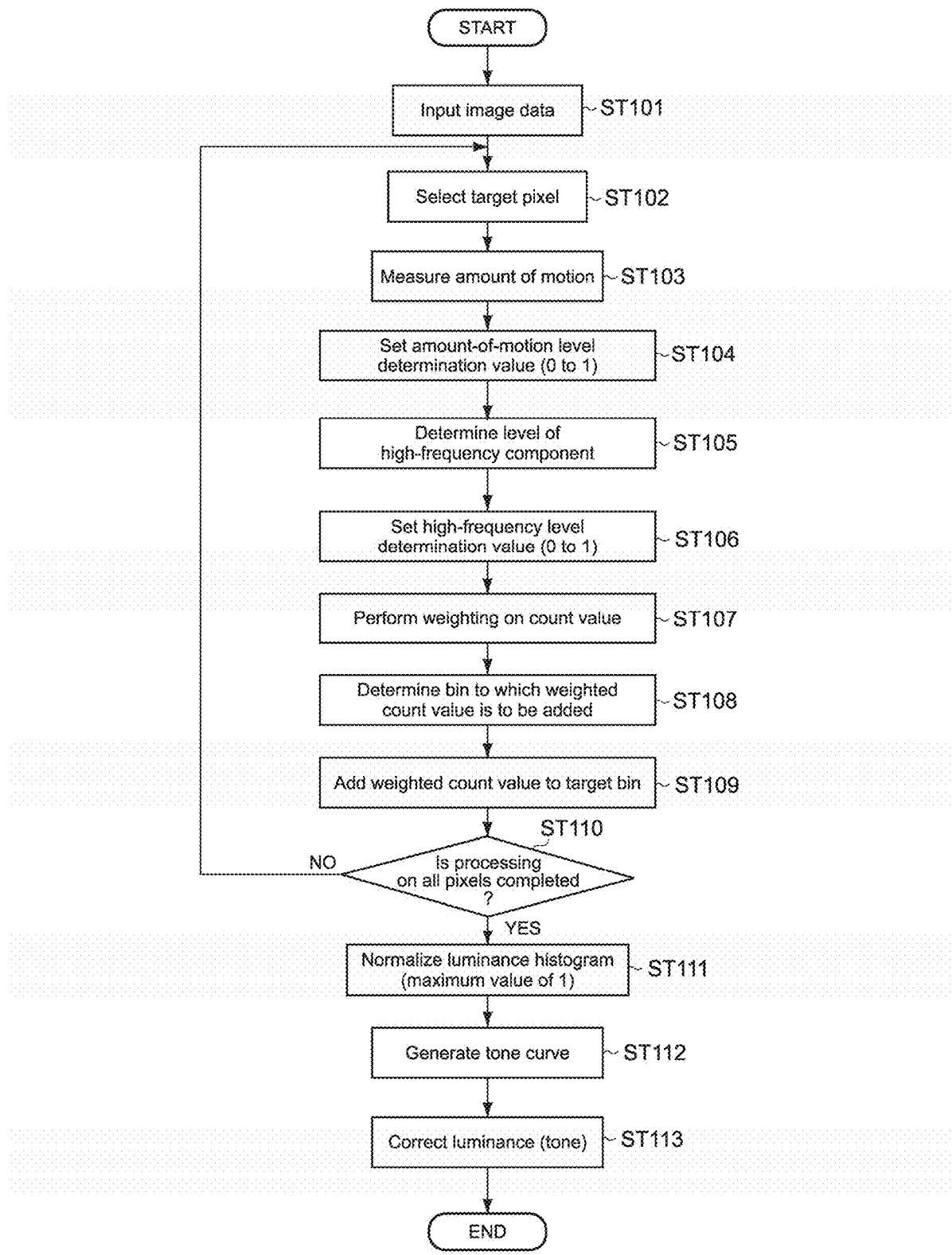
FIG. 2 A flowchart showing processing of an image processor in the surveillance camera system.

Next, the luminance (tone) correction processing in the image processor 15 will be described. FIG. 2 is a flowchart showing processing in the image processor 15.

First of all, the image processor 15 inputs image data (Step 101), and selects one pixel of a plurality of pixels of the image data, as a target pixel (Step 102).

Next, the image processor 15 determines an amount of motion at a position of the target pixel (Step 103). In this determination of the amount of motion, first of all, the image processor 15 acquires luminance information of a pixel of image data in a previous frame, which is located at the same position as the target pixel. Then, the image processor 15 calculates a difference amount between the luminance of the pixel in the current image data and the luminance of the pixel in the image data in the previous frame, and determines an amount of motion at that pixel position on the basis of this difference amount. The amount of motion is a value that increases as the difference amount increases.

As another method for determining the amount of motion, a method based on a motion vector amount is exemplified. In this case, first of all, the image processor 15 determines a position of an object within a predetermined region (e.g., 8 by 8 pixels) formed of a plurality of pixels including the target pixel in the image data in the previous frame.

Then, the image processor 15 determines a position of the object within the predetermined region in the current image data, and calculates a difference amount (motion vector amount) between the position of the object in the image data in the previous frame and the position of the object in the current image data. Then, the image processor 15 determines this difference amount as the amount of motion at the position of the target pixel.

Here, the two methods are exemplified as the methods of determining the amount of motion. One of the two methods may be used or both may be used.

After determining the amount of motion, the image processor 15 sets an amount-of-motion level determination value depending on the determined amount of motion (Step 104). The amount-of-motion level determination value is any of values within a range of 0 to 1. The amount-of-motion level determination value is also a value that increases as the amount of motion increases.

After setting the amount-of-motion level determination value, the image processor 15 performs processing of determining a high-frequency component level at the target pixel (Step 105). In this step, first of all, the image processor 15 acquires luminance information of peripheral pixels present in a periphery of the target pixel. Next, the image processor 15 determines a variance a luminance of the target pixel with respect to luminances of the peripheral pixels and determines the high-frequency component level at the target pixel on the basis of this variance.

Another method of determining the high-frequency component level, there is exemplified a method of summing absolute values of high-frequency components that have passed through a high-pass filter and determining the high-frequency component level on the basis of this sum.

Here, the two methods are exemplified as the methods of determining the high-frequency component level. One of the two methods may be used or both may be used.

After determining the high-frequency component level, the image processor 15 sets a high-frequency level determination value depending on the determined high-frequency component level (Step 106). The high-frequency level determination value is any of values within a range of 0 to 1. The high-frequency level determination value is also a value that increases as the high-frequency component level increases.

Figure 3:
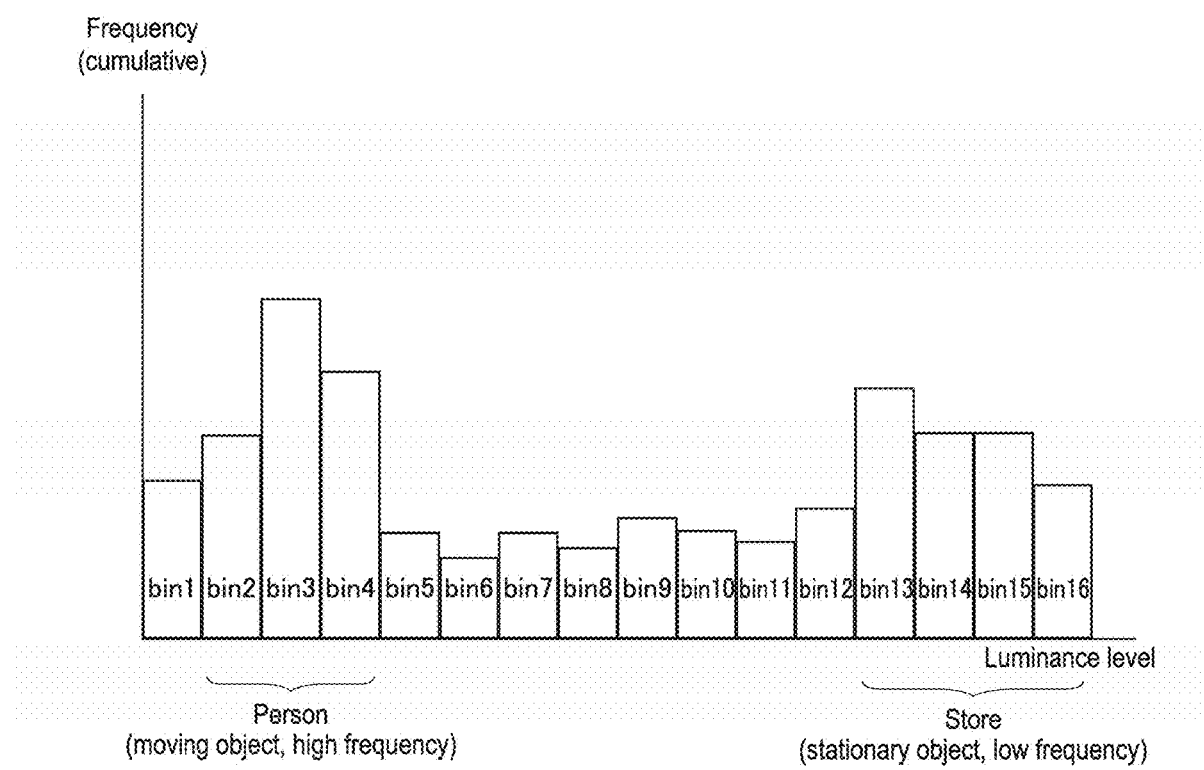
FIG. 3 A diagram showing an example of a luminance histogram.

Here, a luminance histogram indicating a distribution of luminances of the image data will be described with reference to FIG. 3. FIG. 3 is a diagram showing an example of the luminance histogram. In this luminance histogram, the horizontal axis indicates a luminance level and the vertical axis indicates a frequency (cumulative).

The luminance histogram has the luminance level divided into a plurality of parts for each of predetermined luminance ranges in the horizontal axis. Each of the divided luminance ranges is called bin. Although the example in the case where the luminance level is divided into 16 bins is shown in the example shown in FIG. 3, the number of bins is not particularly limited.

Returning to the description of FIG. 2, after setting the high-frequency level determination value, the image processor 15 performs weighting, which depends on the amount of motion and the high-frequency component level, on a count value (this value is set to 1) for counting the frequency in the luminance histogram (Step 107). In this step, first of all, the image processor 15 performs processing of setting a weight value for performing weighting on the count value.

Here, as the method of setting the weight value, there are exemplified [1] to [3] below. [1] Use a larger value of an amount-of-motion level determination value and a high-frequency level determination value as the weight value. [2] Add the amount-of-motion level determination value to the high-frequency level determination value and use the sum as the weight value. [3] Multiply the amount-of-motion level determination value by the high-frequency level determination value and use the product as the weight value (note that, if the product is used, a value equal to or larger than 1 is used as the amount-of-motion level determination value or the high-frequency level determination value).

When setting the weight value, the image processor 15 multiplies this weight value by the count value (set to 1 in this embodiment) and performs weighting on the count value. Note that, hereinafter, the count value on which weighting has been performed will be referred to as a weighted count value for the sake of convenience.

After performing weighting on the count value, the image processor 15 determines a luminance of the target pixel and determines a bin to which the weighted count value is to be added (Step 108). Then, the image processor 15 adds the weighted count value to that bin (Step 109).

Next, the image processor 15 determines whether or not the processing of counting the frequency is completed with respect to all pixels of the image data (Step 110). If pixels on which the processing is to be performed remain (NO in Step 110), the image processor 15 returns to Step 102 and selects one pixel of the remaining pixels as the target pixel.

On the other hand, if the processing is completed with respect to all the pixels (YES in Step 110), the image processor 15 performs normalization such that a maximum value of possible values in the frequency of the luminance histogram (maximum value on vertical axis) is 1 (Step 111). In this case, the image processor 15 performs the normalization by dividing the count value (frequency) of each bin by the total number of count values (frequency) of all the bins. With this, it is possible to suitably cope with a change in the maximum value due to the weighting of the count value.

In this embodiment, a luminance histogram is generated through the processing in Steps 101 to 110 described above. This luminance histogram is generated by counting using a weighted count value as described above. Therefore, the frequency in a bin corresponding to a moving object or an object whose high-frequency component level is high increases.

Figure 4:
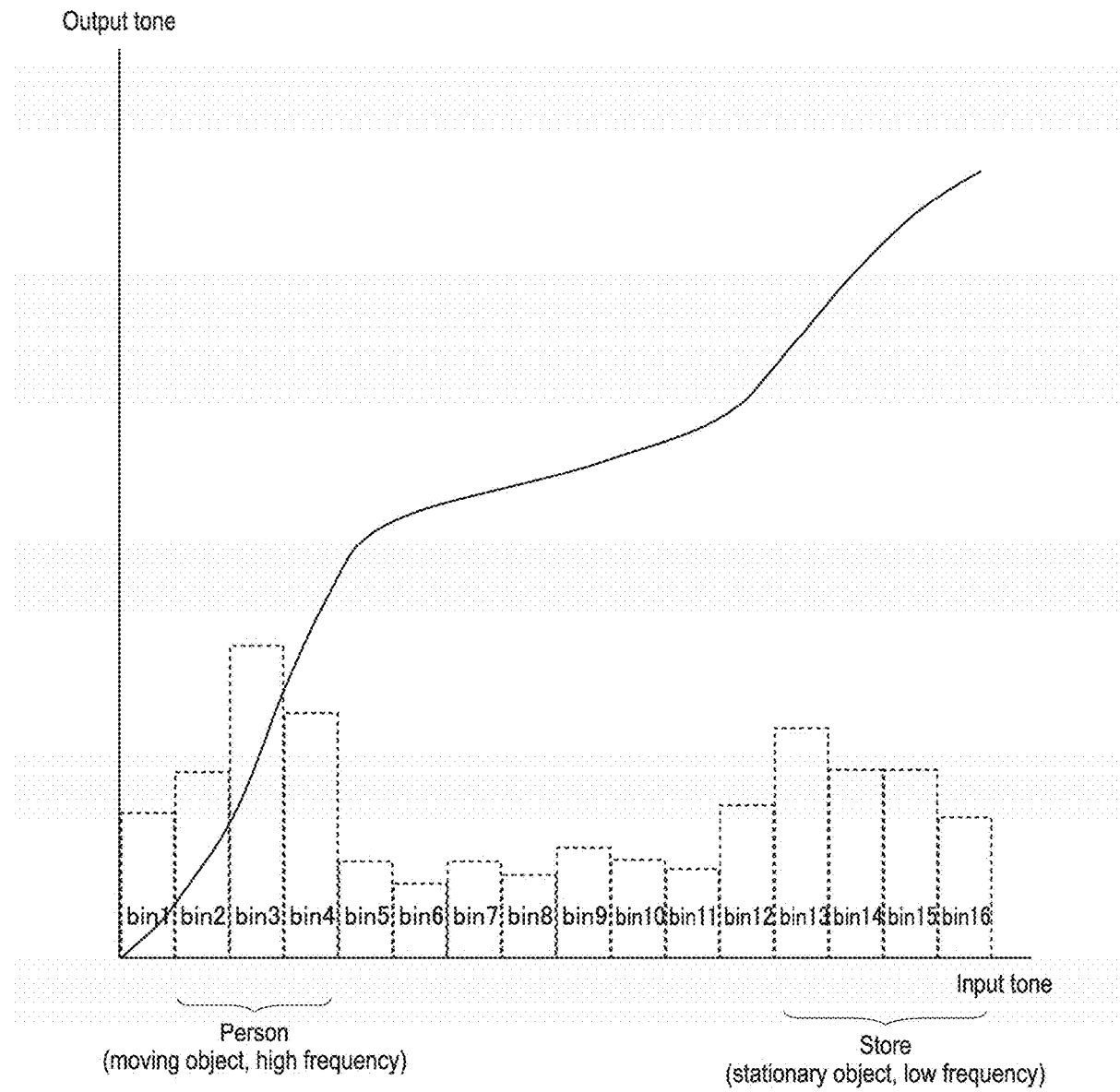
FIG. 4 A diagram showing an example of a tone curve.

After the luminance histogram is generated, the image processor 15 generates a tone curve on the basis of the luminance histogram (Step 112). FIG. 4 is a diagram showing an example of the tone curve. In FIG. 4, the horizontal axis indicates an input luminance (input tone) and the vertical axis indicates an output luminance (output tone). Note that, in FIG. 4, the bins are indicated by broken lines.

Regarding this tone curve, a steeper slope is preferentially allocated to a portion of the luminance histogram at which the frequency is high. That is, in this embodiment, as described above, the luminance frequency is made high corresponding to the moving object or the object having high-frequency components, and hence a steeper slope is preferentially allocated to a luminance corresponding to the moving object or the object having high-frequency components.

Note that, although the luminance histogram and the tone curve is typically generated for each frame, they may be generated for two or more frames.

After generating the tone curve, the image processor 15 corrects the luminance (tone) of the image data on the basis of the generated tone curve and outputs the image data whose luminance (tone) has been corrected (Step 113). At this time, the output image data is an image in which the tones are preferentially allocated to the luminance corresponding to the moving object or the object having high-frequency components.

With this, in this embodiment, it is possible to increase the contrast of the moving object or the object corresponding to high-frequency components. Therefore, in this embodiment, the monitoring person can identify a walking person and a traveling car, for example, when viewing an image displayed on the screen of the display apparatus 26.

<Actions, Etc.>

Hereinafter, actions of the surveillance camera system 100 according to this embodiment will be described using a specific example.

Figure 5:
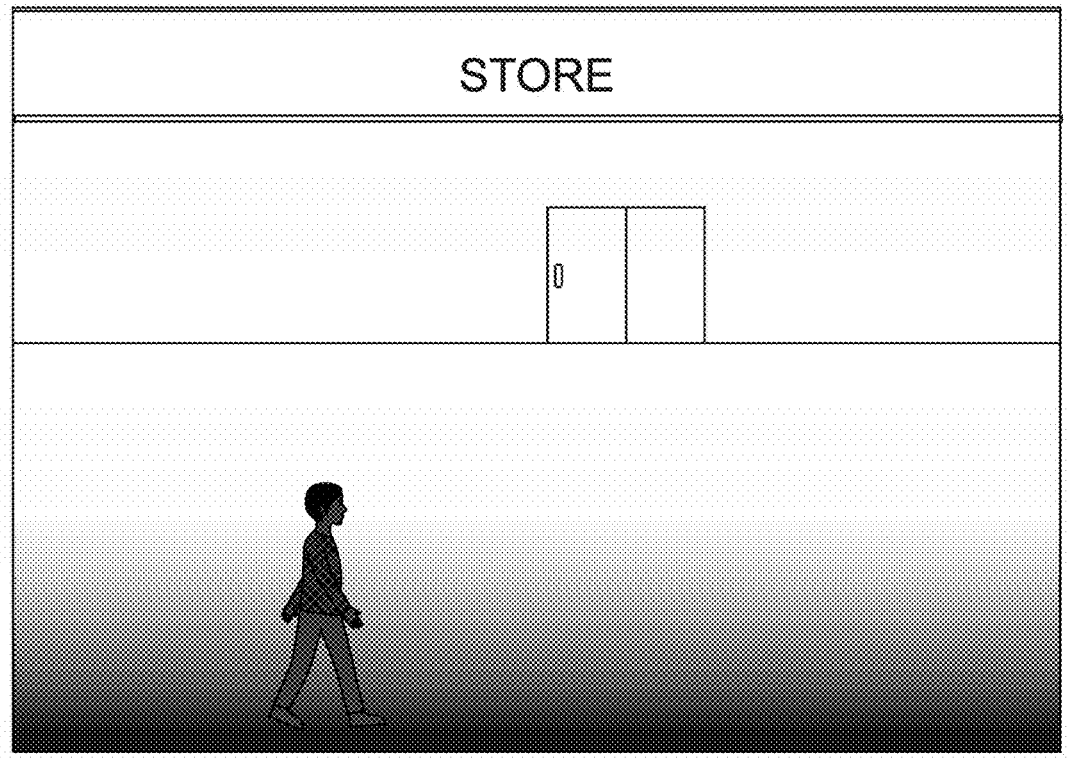
FIG. 5 A diagram showing an example of an image before image processing, which is captured by a surveillance camera unit.

In the example here, a description will be made assuming that the surveillance camera unit 10 is placed in a car park of a store. FIG. 5 is a diagram showing an example of an image captured by the surveillance camera unit 10. This image is an image captured in nighttime. The store is shown on an upper side of the image. Further, a person walking across the car park from the left to the right is shown on a lower side of the image. Note that the image shown in FIG. 5 is an input image before the luminance (tone) is corrected.

Regarding the store, a signboard mounted on a roof portion of the store is brightly lit up and light in the store leaks from the store through a door of the entrance. Therefore, a part of the car park, which is closer to the store, is illuminated by light from the store and brighter. On the other hand, the car park becomes gradually darker as a distance of the car park from the store increases. The person walking across the car park is slightly illuminated by light of the store but still dark.

Here, a case of generating a luminance histogram by not counting using weighting as described above, but simply counting the number of pixels for each luminance and generating a tone curve on the basis of this histogram will be described as a comparison example.

In this case, the luminance tones are preferentially allocated to a part in which the luminance frequency is high (part having the same brightness level and a large area). Therefore, the tones are preferentially allocated to the bright store and the illuminated part of the car park, which has a relatively larger area in the image. On the other hand, a tone ratio allocated to the dark person, which has a relatively smaller area in the image, is relatively lower. Therefore, it is difficult for the monitoring person to identify the face and the clothes of the person walking across the car park.

On the other hand, in the surveillance camera unit 10 according to this embodiment, as described above, a luminance histogram is generated by performing counting such that the luminance frequency increases corresponding to moving object, high frequency (see bins 2 to 4 in FIG. 3). Then, a tone curve is generated on the basis of this luminance histogram, and the luminance (tone) of the image data is corrected on the basis of this tone curve.

Therefore, in this embodiment, the tones are preferentially allocated to the person walking across the car park (who is moving and whose face and clothes have high-frequency components) (i.e., dark part) (see portions of bins 2 to 4 in FIG. 4). On the other hand, tones allocated to the bright store and the brightly illuminated car park (which is not moving and has low-frequency components), each of which has a luminance different from that of the person, are relatively lower (see portions of bins 13 to 16 in FIG. 4).

Figure 6:
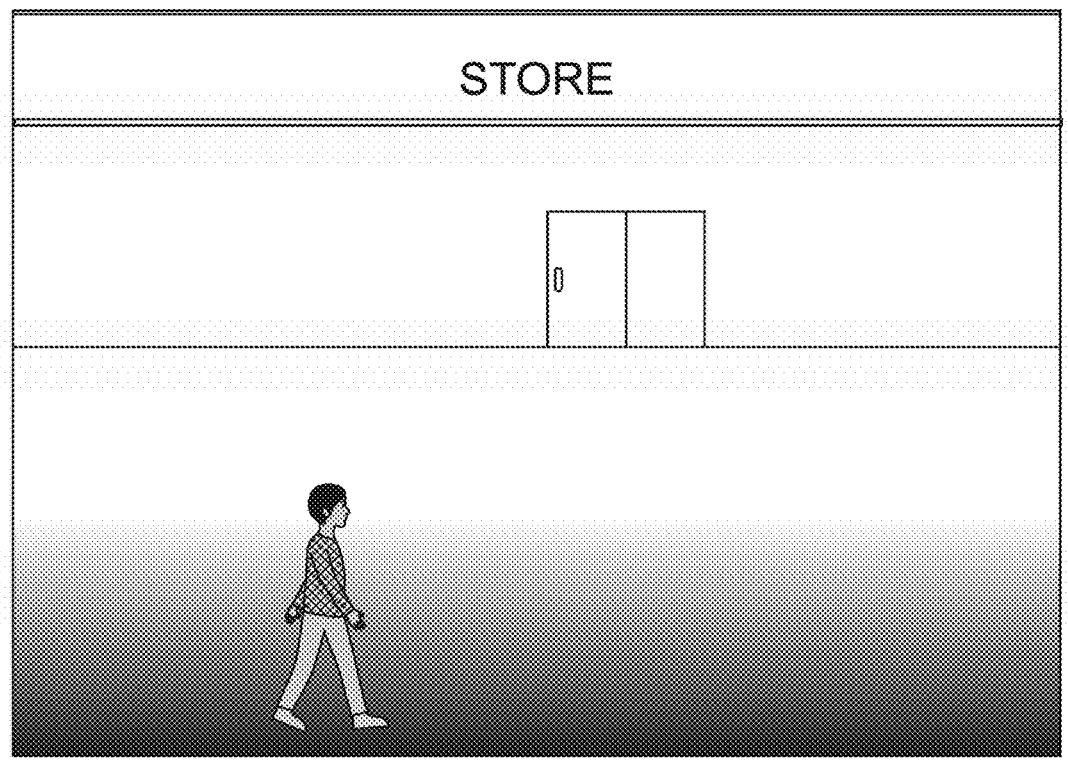
FIG. 6 A diagram showing an example of an image after a luminance is corrected by image processing.

FIG. 6 is a diagram showing an example of the image whose luminance has been corrected by the image processing according to this embodiment.

As shown in FIG. 6, in accordance with this embodiment, the contrast of the person walking across the car park increases, and it becomes easy for the monitoring person to identify the face and the clothes of that person.

Note that, in the case where the person walks across a part of the car park, which is radiated with light from the store, or walks in the store, the tones are preferentially allocated to the radiated person (who is moving and whose face and clothes have high-frequency components) by the processing performed by the image processor 15. On the other hand, tones allocated to the bright store and the dark car park (which is not moving and has low-frequency components), each of which has a luminance different from that of the person, are lower.

In this embodiment, also in this case, the contrast of that person increases, and it becomes easy for the monitoring person to identify the face and the clothes of the person.

Various Modified Examples

Although the case where the image processor 15 is provided in the surveillance camera unit 10 has been described above, the image processor 15 may be provided in the monitoring terminal 20 (i.e., on display apparatus 26 side).

Further, the image processor 15 (image processing apparatus) according to this embodiment is applied to the surveillance camera system 100 has been described above. On the other hand, the image processor 15 may be applied to the display apparatus 26 such as a television apparatus or may be applied to an imaging apparatus such as a digital still camera.

In the above description, the case of performing the weighting, which depends on the amount of motion and the high-frequency component level, on the count value, to thereby generate a luminance histogram reflecting the amount of motion and the high-frequency component level has been described. However, the method of generating a luminance histogram reflecting the amount of motion and the high-frequency component level is not limited thereto.

In one of other method examples, first of all, a first luminance histogram is generated by simply counting the number of pixels for each luminance. Then, in addition to the first luminance histogram, a second luminance histogram is generated on the basis of the amount of motion and a third luminance histogram is generated on the basis of the high-frequency component level. Then, the first luminance histogram is corrected on the basis of the second luminance histogram and the third luminance histogram.

Note that, in the case where a method of generating a luminance histogram by performing weighting, which depends on the amount of motion and the high-frequency component, on the count value is used, processing is easier in comparison with the case of generating the plurality of luminance histograms, and hence it is advantageous.

If other processing can be added, human detection such as facial detection may be carried out in addition to the determination of the amount of motion and the high-frequency component level. In this case, when the frequency of pixels corresponding to a person (face) in the luminance histogram is counted, the count value is multiplied by a weight value larger than those of other parts (or a fourth luminance histogram is generated on the basis of human detection and the first histogram is corrected).

The case where the luminance histogram reflects both of the amount of motion and the high-frequency component level (and human detection) has been described above. However, the luminance histogram may reflect only the amount of motion. Note that, in this case, weighting is performed on the count value on the basis of only the amount of motion.

Although the case of generating the luminance histogram with respect to the entire image has been described above, the luminance histogram may be generated with respect to each of a plurality of blocks.

In this case, first of all, an entire image is divided into a plurality of blocks (e.g., 48 of 8 (horizontal) by 6 (vertical)). Then, a luminance histogram reflecting the amount of motion and the high-frequency component level (and human detection) is generated for each block. After that, a distribution as shown on the left-hand side of FIG. 7 is generated for each bin.

Figure 7:
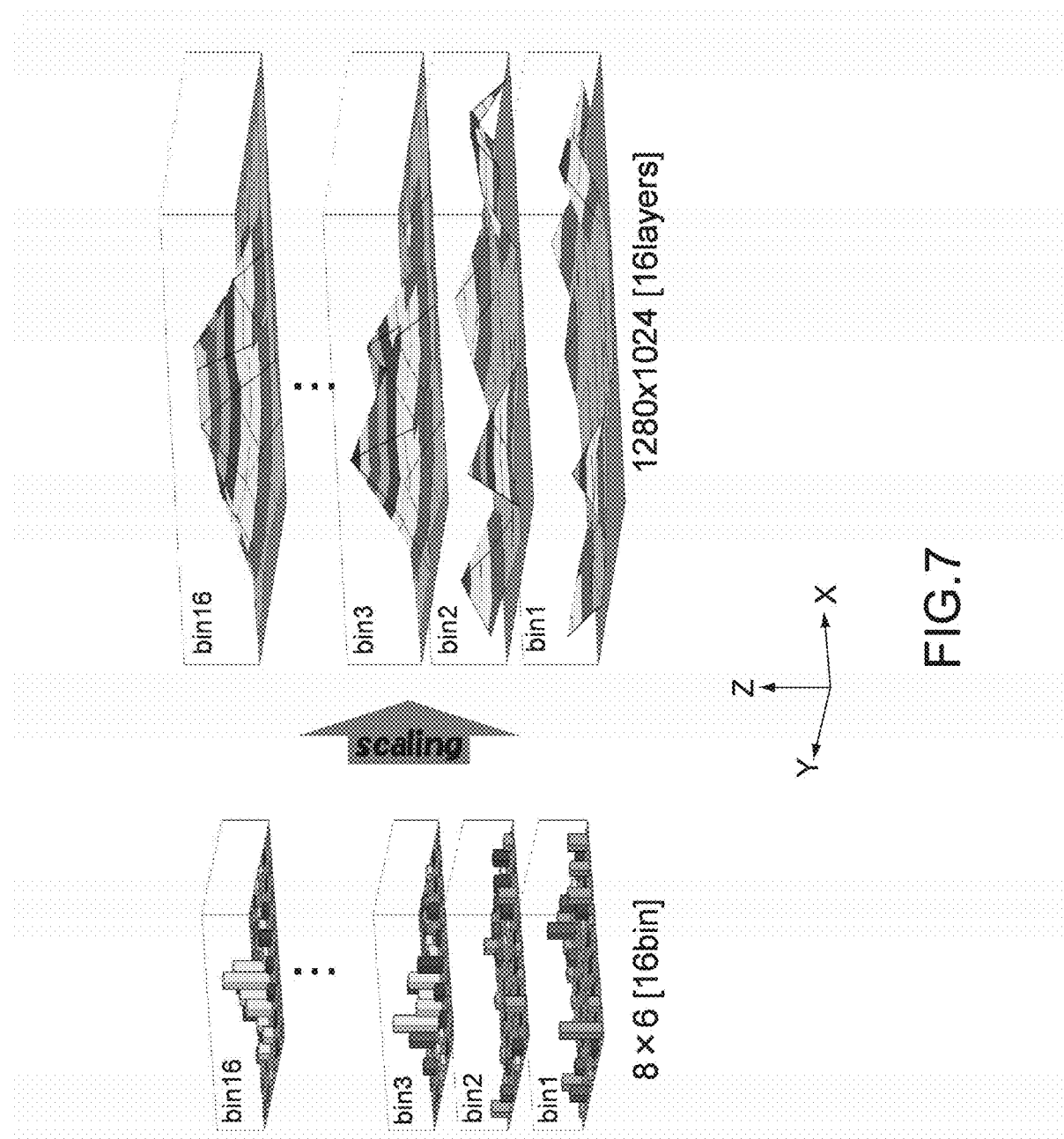
FIG. 7 A supplementary diagram for describing an example in the case of generating a luminance histogram for each of a plurality of divided blocks.

Regarding the distribution shown on the left-hand side of FIG. 7, the X-axis direction and the Y-axis direction indicate a position of a block and the Z-axis direction indicates the frequency in a corresponding bin. After the bin-by-bin distributions shown on the left-hand side of FIG. 7 are generated, scaling using bicubic interpolation is performed on those distributions and each of the distributions is extended to a desired image size (e.g., 1280 by 1024 pixels) (see right part of FIG. 7). Then, on the basis of the extended distributions, a tone curve is generated. With this, it is possible to prevent boundaries of the blocks from being unnatural.

The present technology may also take the following configurations.

(1) An image processing apparatus, including
an image processor that inputs image data, determines an amount of motion within an image on the basis of the image data, and corrects and outputs a luminance of the image data such that a contrast of an object whose amount of motion is large increases.

(2) The image processing apparatus according to (1), in which
the image processor determines a high-frequency component level within the image on the basis of the image data and corrects and outputs the luminance of the image data such that a contrast of an object whose high-frequency component level is high increases.

(3) The image processing apparatus according to (1) or (2), in which
the image processor generates a luminance histogram indicating a distribution of luminances of pixels in the image data and reflecting the amount of motion and generates a tone curve for correcting the luminance of the image data on the basis of the luminance histogram.

(4) The image processing apparatus according to (2) or (3), in which
the image processor generates a luminance histogram indicating a distribution of luminances of pixels in the image data and reflecting the amount of motion and the high-frequency component level and generates a tone curve for correcting the luminance of the image data on the basis of the luminance histogram.

(5) The image processing apparatus according to (3) or (4), in which
the image processor generates, when generating the luminance histogram, the luminance histogram by performing processing of performing weighting, which depends on the amount of motion at a position corresponding to the pixel, on a count value for counting the frequency of pixels and adding the weighted count value to a bin of a plurality of bins divided in a manner that depends on luminances, which corresponds to a luminance of the pixel, the processing being performed for each pixel.

(6) The image processing apparatus according to (4) or (5), in which
the image processor generates, when generating the luminance histogram, the luminance histogram by performing processing of performing weighting, which depends on the amount of motion and the high-frequency component level at a position corresponding to the pixel, on a count value for counting the frequency of pixels and adding the weighted count value to a bin of a plurality of bins divided in a manner that depends on luminances, which corresponds to a luminance of the pixel, the processing being performed for each pixel.

(7) A surveillance camera system, including:
an imaging section placed at a monitoring position; and
an image processor that inputs image data captured by the imaging section, determines an amount of motion within an image on the basis of the image data, and corrects and outputs a luminance of the image data such that a contrast of an object whose amount of motion is large increases.

(8) An image processing method, including:
inputting image data;
determining an amount of motion within an image on the basis of the image data; and
correcting and outputting a luminance of the image data such that a contrast of an object whose amount of motion is large increases.

(9) A program that causes an image processing apparatus to execute the steps of:
inputting image data;
determining an amount of motion within an image on the basis of the image data; and
correcting and outputting a luminance of the image data such that a contrast of an object whose amount of motion is large increases.

REFERENCE SIGNS LIST

1 . . . lens unit
2 . . . control unit
3 . . . turning unit
10 . . . surveillance camera unit
15 . . . image processor
20 . . . monitoring terminal
100 . . . surveillance camera system

The invention claimed is:

1. An image processing apparatus, comprising:
an image processor configured to:
receive image data from an imaging element;
determine an amount of motion in an image based on the image data;
generate a weighted count value based on a weighting process on a count value, wherein:
the weighting process is based on the amount of motion at a position corresponding to a pixel of a plurality of pixels, and multiplication of a weight value and the count value,
the count value counts a frequency of the plurality of pixels in each bin of a plurality of bins, and
the plurality of bins is based on a plurality of luminance values of the plurality of pixels in the image data;
generate, based on the weighted count value, a luminance histogram that indicates a distribution of the plurality of luminance values of the plurality of pixels in the image data;
generate a tone curve based on the luminance histogram;
correct a luminance of the image data based on the tone curve; and
output the image data with the corrected luminance, wherein the corrected luminance causes a contrast value of an object in the image to increase.

2. The image processing apparatus according to claim 1, wherein
the image processor is further configured to:
determine a high-frequency component level of the object within the image based on the image data;
correct the luminance of the image data based on the high-frequency component level of the object; and
output the image data with the corrected luminance.

3. The image processing apparatus according to claim 2, wherein
the luminance histogram further indicates the amount of motion and the high-frequency component level.

4. The image processing apparatus according to claim 1, wherein:
the image processor is further configured to add the weighted count value to a bin of the plurality of bins, and the weighting process is executed for each pixel of the plurality of pixels.

5. The image processing apparatus according to claim 3, wherein:
the weighting process is further based on the high-frequency component level at the position corresponding to the pixel of the plurality of pixels,
the image processor is further configured to add the weighted count value to a bin of the plurality of bins, and
the weighting process is executed for each pixel of the plurality of pixels.

6. A surveillance camera system, comprising:
an imaging section configured to capture image data, wherein the imaging section is at a monitoring position; and
an image processor configured to:
receive the image data captured by the imaging section;
determine an amount of motion in an image based on the image data;
generate a weighted count value based on a weighting process on a count value, wherein:
the weighting process is based on the amount of motion at a position corresponding to a pixel of a plurality of pixels, and multiplication of a weight value and the count value,
the count value counts a frequency of the plurality of pixels in each bin of a plurality of bins, and
the plurality of bins is based on a plurality of luminance values of the plurality of pixels in the image data;
generate, based on the weighted count value, a luminance histogram that indicates a distribution of the plurality of luminance values of the plurality of pixels in the image data;
generate a tone curve based on the luminance histogram;
correct a luminance of the image data based on the tone curve; and
output the image data with the corrected luminance, wherein the corrected luminance causes a contrast value of an object in the image to increase.

7. An image processing method, comprising:
receiving image data from an imaging element;
determining an amount of motion in an image based on the image data;
generating a weighted count value based on a weighting process on a count value, wherein:
the weighting process is based on the amount of motion at a position corresponding to a pixel of a plurality of pixels, and multiplication of a weight value and the count value,
the count value counts a frequency of the plurality of pixels in each bin of a plurality of bins, and
the plurality of bins is based on a plurality of luminance values of the plurality of pixels in the image data;
generating, based on the weighted count value, a luminance histogram that indicates a distribution of the plurality of luminance values of the plurality of pixels in the image data;
generating a tone curve based on the luminance histogram;
correcting a luminance of the image data based on the tone curve; and
outputting the image data with the corrected luminance, wherein the corrected luminance causes a contrast value of an object in the image to increase.

8. A non-transitory computer-readable medium having stored thereon, computer-executable instructions which when executed by a processor of an image processing apparatus, cause the processor to execute operations, the operations comprising:
receiving image data from an imaging element;
determining an amount of motion in an image based on the image data; generating a weighted count value based on a weighting process on a count value, wherein:
the weighting process is based on the amount of motion at a position corresponding to a pixel of a plurality of pixels, and multiplication of a weight value and the count value,
the count value counts a frequency of the plurality of pixels in each bin of a plurality of bins, and
the plurality of bins is based on a plurality of luminance values of the plurality of pixels in the image data;
generating, based on the weighted count value, a luminance histogram that indicates a distribution of the plurality of luminance values of the plurality of pixels in the image data;
generating a tone curve based on the luminance histogram;
correcting a luminance of the image data based on the tone curve; and
outputting the image data with the corrected luminance, wherein the corrected luminance causes a contrast value of an object in the image to increase.

* * * * *